United States Patent [19]

Day et al.

[11] Patent Number: 4,619,540

[45] Date of Patent: Oct. 28, 1986

[54] SPRING PIVOT JOINT FOR MANNEQUIN

[75] Inventors: Robert L. Day, Sun Valley; Robert H. Day, Burbank, both of Calif.

[73] Assignee: S.D.S. Industries, Inc., Pacoima, Calif.

[21] Appl. No.: 632,891

[22] Filed: Jul. 20, 1984

[51] Int. Cl.[4] ............................ F16D 1/12; F16D 3/00
[52] U.S. Cl. ......................................... 403/24; 403/96; 403/97
[58] Field of Search ................. 403/24, 97, 92, 96, 403/93

[56] References Cited

U.S. PATENT DOCUMENTS

| | | | |
|---|---|---|---|
| 1,226,713 | 5/1917 | Benjamin | 403/97 |
| 1,717,035 | 6/1929 | Holt . | |
| 2,676,821 | 4/1954 | Reichelderfer . | |
| 2,682,077 | 6/1954 | Vikre . | |
| 3,277,601 | 10/1966 | Ryan | 403/97 |
| 3,365,209 | 1/1968 | Fischer | 403/96 |
| 3,433,511 | 3/1969 | Frankel | 403/96 |
| 3,875,610 | 4/1975 | Wubbe et al. | 403/97 |
| 4,114,235 | 9/1978 | Remington . | |

Primary Examiner—Thomas F. Callaghan
Assistant Examiner—Peter M. Cuomo
Attorney, Agent, or Firm—Fred Flam

[57] ABSTRACT

A spring pivot joint comprises two face plates with heavy serrations or ribs between them, both sandwiched between Belville springs or spring washers, the washers being held in a strongly stressed condition by a hollow rivet. The face plates have integral wings or tabs extending radially beyond the washers for attachment to the companion mannequin parts to be jointed. Since the rivets are hollow, a simple rod can extend through a plurality of them to hold them in coaxial alignment while being attached to the jointed mannequin parts.

1 Claim, 4 Drawing Figures

U.S. Patent  Oct. 28, 1986  4,619,540
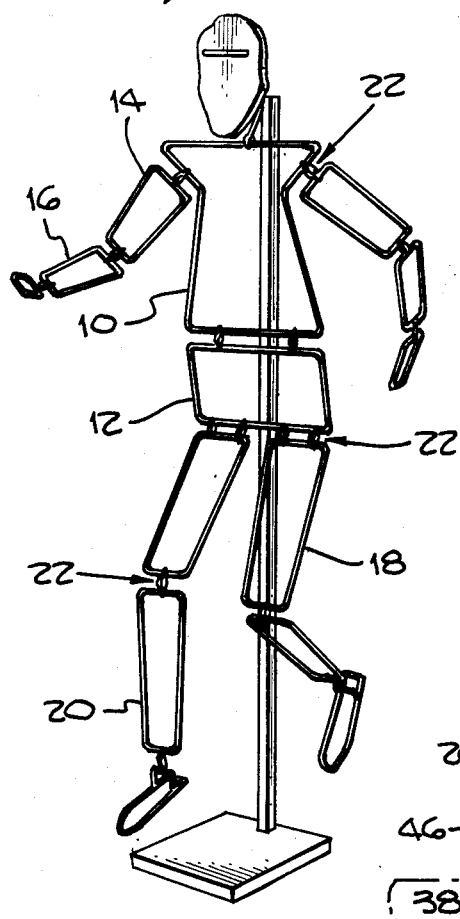
Fig. 1.
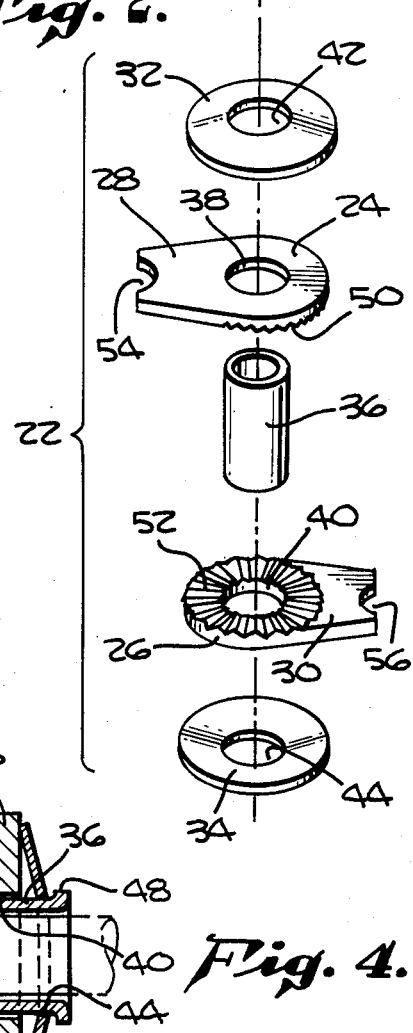
Fig. 2.
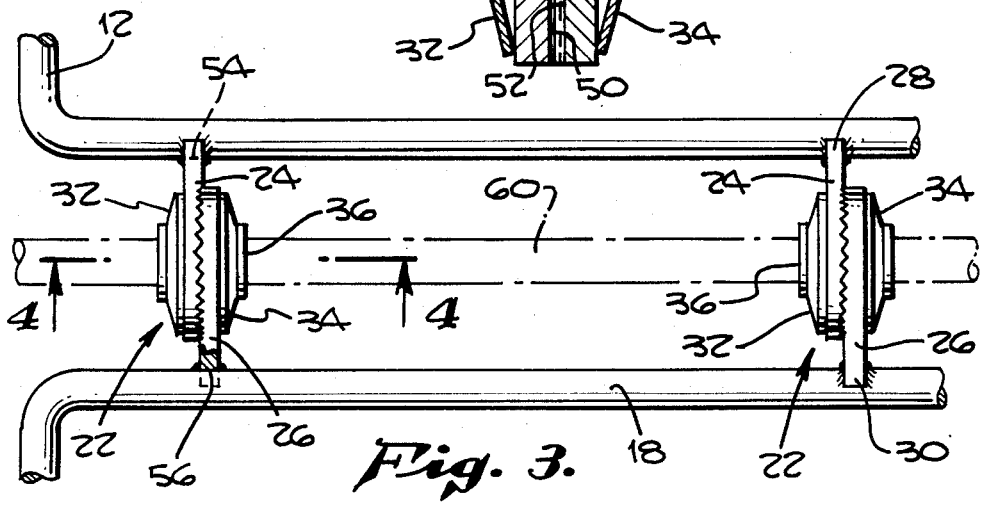
Fig. 4.
Fig. 3.

SPRING PIVOT JOINT FOR MANNEQUIN

PRIOR ART STATEMENT

A patentability search directed to this subject matter located patents to:
Lancaster, U.S. Pat. No. 129,239, 1872
Pedersen, U.S. Pat. No. 958,167, 1910
Anderson, U.S. Pat. No. 959,099, 1910
Holt, U.S. Pat. No. 1,717,035, 1929
Reichelderfer, U.S. Pat. No. 2,676,821, 1954
Vikre, U.S. Pat. No. 2,682,077, 1954
Remington, U.S. Pat. No. 4,114,235, 1978

FIELD OF INVENTION

This invention relates to simple mannequin structures, and more particularly to an improved spring pivot therefor.

BACKGROUND OF THE INVENTION

Traditional mannequins for display of clothing are complex and expensive items. Moreover, the range of movement of certain joints is fairly limited. There have been attempts at compromise.

One known inexpensive mannequin comprises a wire fashioned generally to assume a human form, the wire being bendable to produce any desired configuration or attitude. The structure is somewhat flimsy, and the wire is subject to fatigue failure.

Another known relatively inexpensive mannequin utilizes flat components connected together by traditional hinges, such as piano hinges. Supplemental braces or other means must be provided to maintain the parts in a set position.

The object of the present invention is to provide a pivot joint for companion mannequin parts that incorporates self contained strong yieldable spring means so that the contiguous parts can easily be deliberately articulated while the parts strongly resist accidental movement from their set position.

Another object of this invention is to provide a pivot joint that can readily cooperate with a simple fixture whereby a plurality of spring pivot joints can be held in a coaxial relationship while welded or otherwise attached to the mannequin parts.

SUMMARY OF INVENTION

In order to accomplish the foregoing objectives, I provide a spring pivot joint that comprises two face plates with heavy serrations or ribs between them, both sandwiched between Belville springs or spring washers, the washers being strongly stressed by a hollow rivet. The face plates have integral wings or tabs extending radially beyond the washers for attachment to the companion parts to be jointed. Since the rivets are hollow, a simple rod can extend through a plurality of them to hold them in coaxial alignment while being attached to the jointed parts.

BRIEF DESCRIPTION OF THE DRAWINGS

A detailed description of the invention will be made with reference to the accompanying drawings wherein like numerals designate corresponding parts in the several figures. These drawings are to scale.

FIG. 1 is a pictorial view of a mannequin supported on a standard, the mannequin parts being joined together by spring pivot joints incorporating the present invention.

FIG. 2 is an exploded view of one of the pivot joints, and on a scale much enlarged as compared to FIG. 1.

FIG. 3 is a fragmentary elevational view showing a pair of spring pivot joints fixtured on a straight rod for coaxial attachment to companion parts of the mannequin.

FIG. 4 is an enlarged sectional view taken axially of the fixture rod along a plane corresponding to line 4—4 of FIG. 3.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

The mannequin shown in FIG. 1 includes a series of body parts—upper and lower torso parts 10 and 12, upper and lower arm parts 14 and 16, upper and lower leg parts 18 and 20, etc. Each of the parts is made in two dimensional loop outline form by round metal rod material.

In order to connect the body parts together, a number of identical spring pivot joints 22 are provided. Each pivot joint 22 comprises a pair of essentially flat plates 24 and 26 having circular parts in face to face contact. Each of the plates has an attachment wing or tab 28, 30 in the plane of the plate, and to be described more fully hereinafter.

The plates 24 and 26 are firmly held in contact by a pair of Belville springs 32 and 34 (FIGS. 2 and 4). The springs and plates are held in a stack by the aid of a tubular rivet 36 that extends through holes 38, 40, 42 and 44 in the plates and springs. Heads 46 and 48 (FIG. 4) of the rivet 36 are formed over the edges of the holes 42 and 44 in the springs while the springs are stressed thereby to hold the springs in a normally stressed condition.

While the springs provide significant force to generate substantial frictional resistance to relative angular movement of the plates, it is essential to increase the resistance since considerable turning torque can be imposed upon the plates under static load conditions.

In order to increase the resistance, the plates 24 and 26, as shown in FIG. 2 have on their facing surfaces, heavy serrations or ribs 50 and 52. These ribs are formed by angular channels radiating from the center of the plates. The ribs or serrations 50 and 52 mate or interdigitate at any one of a number of relative angular positions corresponding to the number of ribs. The angular channels form ramps along which the companion ribs must rise before the plates can be indexed to the next relative angular position. This requires the Belville springs to be compressed in the process. By using Belville springs of substantial spring constants, the torque required to cause angular movement of the plates is made correspondingly substantial.

The wings or tabs 28 and 30 of the plates project beyond the Belville springs (FIG. 4) for attachment, as by welding, to the rods forming companion mannequin parts. To facilitate the attachment, the wings have recesses 54 and 56 (FIG. 2) to fit the rods.

The mannequin parts connected by spring pivots can be moved relative to one another in order to provide many different configurations for purposes of displaying clothing. The torque required to move the parts from an adjusted position is considerable by virtue of the characteristics of the spring pivots. Neither accidentally imposed forces of considerable magnitude nor the considerable static load of the clothing is sufficient to disturb the adjustment.

A single spring pivot connects some of mannequin parts. However, two spring pivots may be required to connect other parts. For example, the upper leg part 18 is joined to the lower torso part 12 by two spaced apart spring pivots. It is of course essential that these parts be precisely coaxial to ensure smooth operation without binding. Coaxiality is ensured by using a rod 60 (FIG. 3) as a simple fixture. The rod 60 extends through the rivets 36 of all spring pivots requiring alignment while the tabs or wings are welded to the mannequin parts.

Intending to claim all novel, useful and unobvious features and combinations of features shown and/or described,

We claim:

1. A pair of parts to be joined together for pivotal movement, the combination therewith of
   (1) a plurality of spring pivots, each spring pivot including:
     a. a pair of pivot plates in face to face contact, and each plate having a wing or tab for attachment to the parts respectively;
     b. a pair of Belville spring washers encompassing said pivot plates;
     c. a hollow rivet extending through aligned holes in said pivot plates and said spring washers, said rivet having heads confining said parts in a stack and loading said spring washers so that substantial frictional resistance is imposed against relative angular movement of said parts;
     d. said attaching wings or tabs extending radially beyond said spring washers; and
   (2) a rod extending in slidably fitted relationship through the hollow rivets to hold said spring pivots in coaxial relationship while said wings or tabs are attached to said parts, said rod being slidably removable from said spring pivots;
   (3) said spring pivots being joined to each other only through said parts when said rod is removed; said spring pivots confining said parts for angular movement about the common axis of said spring pivots.

* * * * *